United States Patent Office 3,655,741
Patented Apr. 11, 1972

3,655,741
PRODUCTION OF o-BENZOYLBENZOIC ACID
Hans Juergen Sturm and Herbert Armbrust, Gruenstadt, and Hans Nienburg and Wolfgang Eisfeld, Ludwigshafen, Germany, assignors to Badische Anilin- & Soda-Fabrik Aktiengesellschaft, Ludwigshafen (Rhine), Germany
No Drawing. Filed June 23, 1970, Ser. No. 49,165
Claims priority, application Germany, July 4, 1969,
P 19 34 055.7
Int. Cl. C07c 65/20
U.S. Cl. 260—517
11 Claims

ABSTRACT OF THE DISCLOSURE

Production of o-benzoylbenzoic acid by oxidation of an indan with oxygen in the presence of a catalyst in the liquid phase. The product is a starting material for many syntheses (see for example Ullmanns Encyklopädie der Technischen Chemie, volume 3, pages 660 et seq.). It is of particular importance as a starting material for the manufacture of anthraquinone.

---

The invention relates to a process for the production of o-benzoylbenzoic acid by the oxidation of an indan with oxygen in the presence of a catalyst in the liquid phase.

In the oxidation of 1-methyl-3-phenylindan with chromic acid, o-benzoylbenzoic acid is formed, but only in an unsatisfactory yield and mixed with a high proportion by byproducts, for example o-acetylbenzophenone (J. Org. Chem., 19, 17 et seq. (1954); J. Amer. Chem. Soc., 72, 4918 et seq. (1950)). This result is due at least in part to the influence of the oxidizing medium on the o-benzoylbenzoic acid formed. When o-benzoylbenzoic acid is oxidized under the conditions of this process, only 45% of the starting material is recovered unreacted, the major portion has therefore been destroyed by the oxidation medium. (J. Amer. Chem. Soc., loc. cit., page 4929.) When using 1,1,3-trimethyl-3-phenylindan as the starting material, the oxidation process has to be modified, yet the modified process gives only moderate yields of o-benzoylbenzoic acid and a high proportion of o-acetylbenzophenone (Berichte der Deutschen Chemischen Gesellschaft, 90, 1208 et seq. (1957)).

It is also known that 1,1,3,5-tetramethyl-3-(p-tolyl)-indan can be converted by bromide-activated oxidation with oxygen in liquid phase into 1,1,3-trimethyl-5-carboxy-3-(p-carboxyphenyl)-indan (Towle, Hydrocarbon Processing, 43, 149 (1964); Amoco Bulletin PD–1A of Amoco Chemicals Corporation, 1967). In this method methyl groups in nuclear position are oxidized into carboxyl groups without the indan skeleton being attacked.

An object of this invention is to provide a new process for producing o-benzoylbenzoic acid in better yields and very high purity in a simple and economical manner.

This and other objects are achieved and o-benzoylbenzoic acid is advantageously obtained by oxidizing an indan having the general formula:

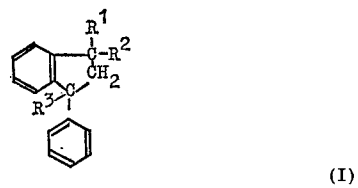

(I)

in which $R^1$, $R^2$ and $R^3$ may be identical or different and each denotes an alkyl radical, and $R^1$ and/or $R^3$ may also denote a hydrogen atom, with oxygen in the liquid phase in the presence of a heavy metal salt and a compound yielding bromide ions.

When 1-methyl-3-phenylindan is used, the reaction may be represented by the equation:

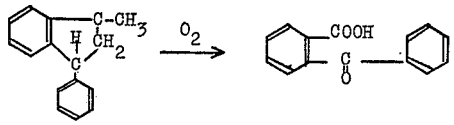

Contrasted with prior art methods, the process according to this invention gives better yields and very high purity o-benzoylbenzoic acid in a simple and economical way.

The indans used as starting materials (I) may be prepared by dimerization of unsubstituted or substituted styrenes, for example by methods described in the abovementioned publications or in Rabjohn, Organic Syntheses, Collective Volume IV (John Wiley Inc., New York, 1963) pages 665 et seq. Preferred indans (I) are those in whose formulae $R^1$, $R^2$ and $R^3$ are identical or different and each denotes an alkyl radical having one to eight, particularly one to four, carbon atoms, and $R^1$ and/or $R^3$ may also each denote a hydrogen atom. Examples of suitable indans are 1-methyl-3-phenylindan, 1,3-dimethyl-3-phenylindan, 1,1,3-trimethyl-3-phenylindan, 1-propyl-3-phenylindan and 1-isobutyl-3-phenylindan.

The starting materials are oxidized with oxygen only or with oxygen mixed with gases which are inert under the reaction conditions, preferably air, the oxygen partial pressure being from 0.2 to 10 atmospheres.

Heavy metal salts together with compound yielding bromide ions are used as catalysts. The heavy metal salts may be inorganic or organic salts, particularly cobalt or manganese salts, for example cobalt or manganese chlorate, chloride, 2-ethylhexanate, bromate, propionate, butyrate, naphthenate or preferably bromide or acetate; mixtures may also be used.

Generally from 0.1 to 10% by weight of heavy metal salt is used with reference to starting material (I). It is preferred to use bromides of metals of main groups 1, 2, 3, 4 and 5 of the Periodic System as the compound yielding bromide ions. Thus for example the following bromides may be used as catalysts: sodium, potassium, calcium, barium, lead, antimony, manganese, tin, aluminum, magnesium or iron bromide. Catalyst combinations of heavy metal salts, for example cobalt salt, and bromide are used in such proportions of the components that a ratio of from 0.2 to 2 gram equivalents of bromide are present to 1 mole of heavy metal salt. Organic compounds which yield a bromide ion, for example ethyl bromide, dibromoethane or benzyl bromide, are also suitable.

The oxidation is carried out at a temperature of from 100° to 270° C., preferably from 120° to 180° C., at atmospheric pressure, for example up to 50 atmospheres, continuously or batchwise. Alkane carboxylic acids, preferably having two to four carbon atoms, for example acetic acid, are used as a rule. It is advantageous to use solutions with from 5 to 25% by weight of starting material (I) in an alkane carboxylic acid.

The reaction may be carried out as follows: a mixture of starting material (I), heavy metal salt, a compound yielding a bromide ion and if desired an alkane carboxylic acid is oxidized with air at the reaction pressure and the reaction temperature for three to five hours. The end product is then isolated from the reaction mixture by a conventional method, for example by distillation of the solvent and recrystallization of the residue from a suitable solvent such as chlorobenzene.

In a preferred embodiment of the invention, the end product formed is not separated from the reaction mixture but, after the solvent has been separated, is converted direct into anthraquinone by a conventional method, for example by means of a dehydrating agent such as sulfuric acid or phosphoric acid.

The compound which can be prepared by the process according to the invention is a valuable starting material for many syntheses (see for example Ullmanns Encyklopädie der Technischen Chemie, volume 3, pages 660 et seq.). It is of particular importance as a starting material for the production of anthroquinone. The process according to the invention opens up a convenient way of manufacturing anthraquinone, starting from inexpensive styrene. Benzanthrone (which is another starting material for dyes) is obtained by reaction with glycerol under reducing conditions (Annali di Chimica Applicata, 22, 691 et seq. (1932)).

The following example illustrates the invention. The parts specified in the example are parts by weight. They bear the same relation to parts by volume as the kilogram to the liter.

EXAMPLE

A solution of 50 parts of 1-methyl-3-phenylindan (94%) in 450 parts of glacial acetic acid is placed in an autoclave having a capacity of 1000 parts by volume and fitted with a high-speed stirrer and a reflux condenser, and 2.0 parts of cobalt bromide and 1.5 parts of manganese acetate are added to the solution. Oxidation is carried out at a pressure of 30 atmospheres of air at 160° C. for 5.5 hours, 70,000 parts by volume of offgas being released from the reflux condenser per hour. The acetic acid is expelled from the crude oxidation solution under subatmospheric pressure and the residue is dissolved in 400 parts of 85% sulfuric acid for conversion into anthraquinone. The mixture is stirred for one hour at 150° C. and allowed to cool. The mixture is added to ice-water, suction filtered and the filter cake is dried. The crude anthraquinone (29.8 parts) is extracted with benzene and the benzene extract is evaporated. 22.95 parts of anthraquinone having a melting point of 278° C. is obtained. This is 48.8% of the theory based on the 1-methyl-3-phenylindan, calculated as 100%, used.

We claim:

1. A process for the production of o-benzoylbenzoic acid oxidizing an indan having the formula

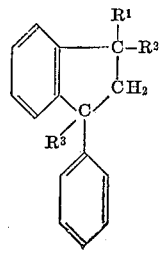

in which $R^1$ and $R^3$ each denotes hydrogen or alkyl and $R^2$ denotes alkyl at a temperature of from 100° to 270° C. with oxygen in the liquid phase in the presence of a compound which yields a bromide ion and at least one salt of a heavy metal selected from the group consisting of cobalt and manganese.

2. A process as claimed in claim 1 carried out with air at an oxygen partial pressure of from 0.2 atmosphere to 10 atmospheres.

3. A process as claimed in claim 1 carried out in the presence of cobalt or manganese bromide or acetate.

4. A process as claimed in claim 1 carried out in the presence of cobalt or manganese chlorate, chloride, 2-ethylhexanate, bromate, propionate, butyrate or naphthenate.

5. A process as claimed in claim 1 carried out with 0.1 to 10% by weight (based on the starting material, I) of heavy metal salt.

6. A process as claimed in claim 1 carried out with a bromide of a metal of main group 1, 2, 3, 4 or 5 of the Periodic System.

7. A process as claimed in claim 1 carried out with sodium, potassium, calcium, barium, lead, antimony, manganese, tin, aluminum or iron bromide.

8. A process as claimed in claim 1 carried out with a ratio of 0.2 to 2 gram equivalents of bromide to each mole of heavy metal salt.

9. A process as claimed in claim 1 carried out at a temperature of from 120° to 180° C.

10. A process as claimed in claim 1 carried out at a pressure of up to 50 atmospheres.

11. A process as claimed in claim 1 carried out with a solution of 5 to 25% by weight of starting material (I) in acetic acid.

References Cited

UNITED STATES PATENTS 3,075,007   1/1963   McCracken et al. ____ 260—517
3,089,879   5/1963   Serres et al. _____ 260—376

OTHER REFERENCES

Spoerri et al.: Jour. Amer. Chem. Soc., vol. 72, pp. 4918–20 (1950).
Dierichs et al.: Ber., vol. 90, pp. 1208–14 (1957).

JAMES A. PATTEN, Primary Examiner

U.S. Cl. X.R.

260—352, 369

UNITED STATES PATENT OFFICE
CERTIFICATE OF CORRECTION

Patent No. 3,655,741                    Dated April 11, 1972

Inventor(s) Hans Juergen Sturm et al

It is certified that error appears in the above-identified patent and that said Letters Patent are hereby corrected as shown below:

Column 4, line 16, claim 5, "(based on the starting material, I)" should read -- , based on the starting material (I), --.

Signed and sealed this 5th day of September 1972.

(SEAL)
Attest:

EDWARD M. FLETCHER, JR.
Attesting Officer

ROBERT GOTTSCHALK
Commissioner of Patents